United States Patent
Martin et al.

(10) Patent No.: US 9,014,680 B2
(45) Date of Patent: Apr. 21, 2015

(54) APPARATUS, AND AN ASSOCIATED METHOD, BY WHICH TO ACTIVATE A WIRELESS DEVICE FOR A TEMPORARY PERIOD

(75) Inventors: Daryl Joseph Martin, Kitchener (CA); James Andrew Godfrey, Waterloo (CA); John Ferguson Wilson, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 696 days.

(21) Appl. No.: 12/855,228

(22) Filed: Aug. 12, 2010

(65) Prior Publication Data

US 2012/0040654 A1    Feb. 16, 2012

(51) Int. Cl.
*H04M 3/00* (2006.01)
*H04W 8/26* (2009.01)

(52) U.S. Cl.
CPC .................................... *H04W 8/265* (2013.01)

(58) Field of Classification Search
USPC ........... 455/415, 420; 380/247; 713/172, 171, 713/150; 709/220, 227, 204, 247
See application file for complete search history.

(56) References Cited

U.S. PATENT DOCUMENTS

| 8,655,966 | B1 * | 2/2014 | Raj et al. ......................... 709/206 |
| 2005/0198319 | A1 * | 9/2005 | Chan et al. .................... 709/228 |
| 2006/0190581 | A1 * | 8/2006 | Hagale et al. ................. 709/223 |
| 2008/0114862 | A1 * | 5/2008 | Moghaddam et al. ........ 709/220 |
| 2009/0164355 | A1 * | 6/2009 | Mo et al. .......................... 705/30 |
| 2009/0325566 | A1 * | 12/2009 | Bell et al. ...................... 455/419 |

* cited by examiner

*Primary Examiner* — Nimesh Patel
(74) *Attorney, Agent, or Firm* — Fleit Gibbons Gutman Bongini & Bianco P.L.

(57) ABSTRACT

An apparatus, and an associated method, for providing secured effectuation of a communication service at a substitute mobile station. A user desiring temporarily to use a substitute mobile station to carry out the communication service initiates a request at the mobile station for its use. The communication service is available to be performed at the substitute mobile station for a selected period. Upon termination of the selected period, the communication service session ends, and data associated with the communication service session is deleted from the substitute mobile station.

22 Claims, 3 Drawing Sheets

APPARATUS, AND AN ASSOCIATED METHOD, BY WHICH TO ACTIVATE A WIRELESS DEVICE FOR A TEMPORARY PERIOD

The present disclosure relates generally to a manner by which to provide for temporary activation of a wireless device. More particularly, the present disclosure relates to an apparatus and an associated method by which to activate a wireless device, such as a wireless device borrowed from another, to provide for secure effectuation of a selected communication service for a selected period.

If the user forgets, misplaces, or otherwise is unable to use the wireless device that is regularly used by the user, the user is able to borrow a substitute, wireless device and use the substitute wireless device to perform a selected communication service for a selected period.

BACKGROUND

Wireless devices are used by many in modern society. Wireless devices are used in the performance of many varied communication services. Mobile stations operable in a cellular, or cellular-like, communication system, are exemplary of wireless devices used by many for the performance of communication services.

Early-generation, cellular communication systems provided primarily for voice communication services. But, successor-generation systems provide for increasingly data-intensive communication services. Wireless devices are, e.g., regularly used to exchange email messages, messages with attachments, perform messaging services, and perform scheduling, address-book, and other functions.

As a wireless device communicates by way of a radio air interface, communications services are performable by way of the wireless device from almost any location within an area encompassed by the network of the communication system. Thereby, a user of the wireless device need not be positioned at a location that provides wire line connections with another communication station to permit the communication of data pursuant to a communication service with the other communication station.

In some configurations, a network server, or other network entity, provides various control and communication functions pursuant to communication of data with a wireless device. For instance, such entities sometimes provide various security features and provide for the routing of data to and from the mobile station.

In such an arrangement, the wireless device is sometimes associated with an account and is allocated for use by a single user identity. The network entity, for instance, causes activation of the wireless device in which a shared key is created, service books are pushed to the wireless device, and database data is pushed to the wireless device. In one scheme, a summary message, in XML or other format, is sent to the wireless device. The wireless device displays the summary message on a graphical user interface window. The summary message indicates services that are available for activation. And, a user of the wireless device causes the wireless device to send back indications of one or more services that are selected for activation. And, in turn, the service books and IT policies associated with the selected services are pushed to the wireless device. And, synchronization of the data is performed. When a communication service is to be performed with the mobile station or personal/private data is to be provided to the mobile station, the mobile station is first authenticated, or otherwise identified, to permit the performance of the communication service. Communication of data is permitted once the mobile device is appropriately authenticated or otherwise identified. And, when data is communicated, the communicated data is, e.g., encrypted to increase the security of the communications. Such encryption, sometimes utilizes an exchange of keys between the network entity and the wireless device.

Access of a user to the wireless device to perform a communication service or access private/personal data to send or to receive communication data, or to access communication data previously communicated, is sometimes time-critical. When the wireless device is accessible, and the wireless device is within communication range of a communication network, a time-critical communication service can be performed or the needed communication data can be accessed. But, in the event that the wireless device is not accessible to the user, the user is unable to perform the communication service or access the needed data.

If, for example, the user forgets the wireless device at home while running errands, the user is unable to perform the communication service. Analogously, if the wireless device is lost, then the user also is unable to perform the communication service or access the needed data. E-mail accounts are sometimes accessible via a mobile web browser. But, sometimes such access is not permitted. Some enterprises, e.g., do not permit public access to enterprise networks.

While the user might be located with others who have similar wireless devices, due to the conventional association of a mobile station with a single account, the user is unable to use the mobile station of another to carry out the needed communication service or access the needed communication data.

Existing wireless communication system operation therefore generally fails to provide a manner by which to facilitate a user's performance of a communication service or access to communication data stored at a wireless device of the user when the user does not have the wireless device readily available.

It is in light of this background information related to use of wireless devices by which to perform communication services that the significant improvements of the present invention have evolved.

DETAILED DESCRIPTION

Figure 1:
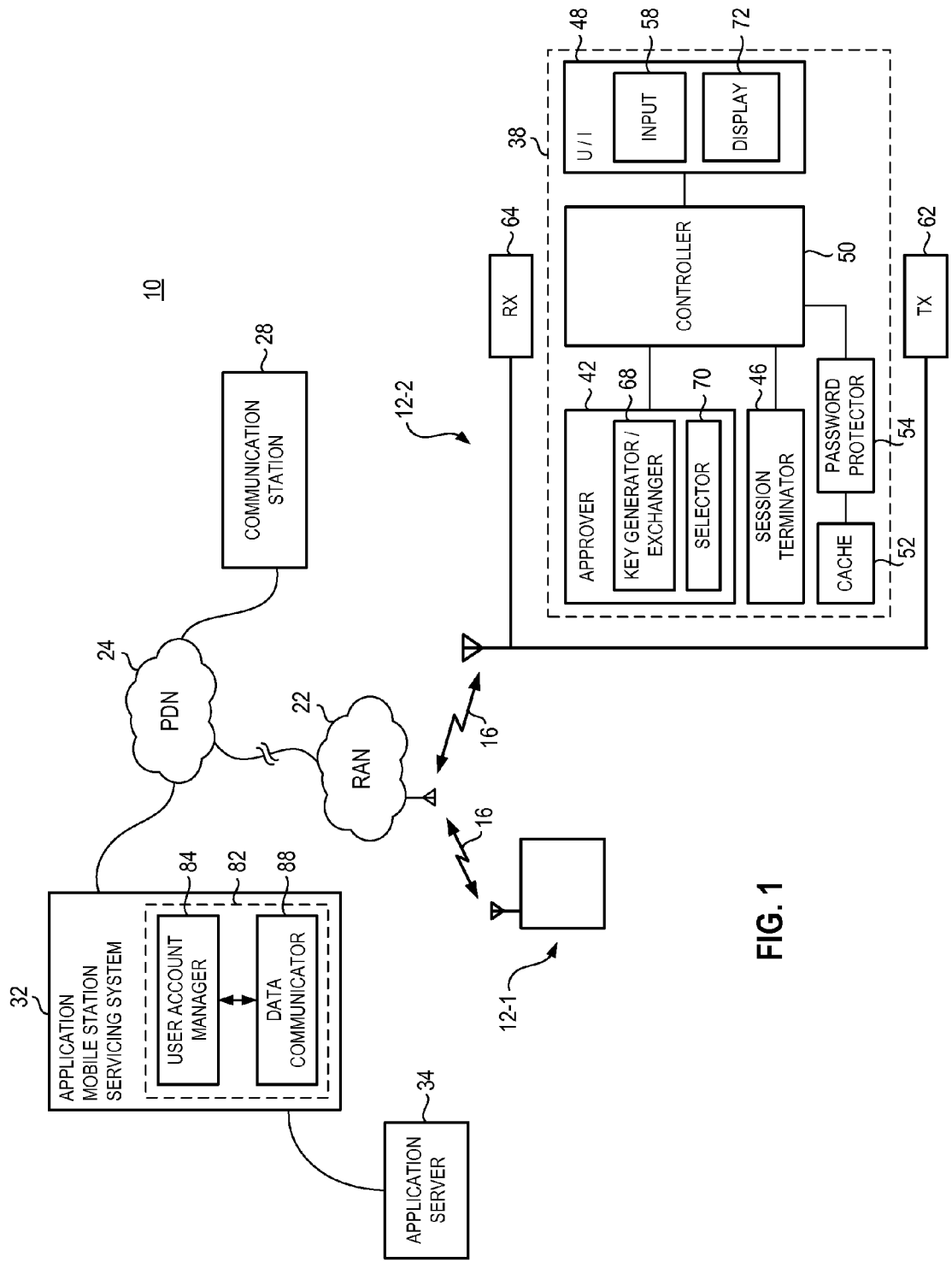
FIG. 1 illustrates a functional block diagram of a radio communication system, which includes an embodiment of the present disclosure as a portion thereof.

The present disclosure, accordingly, advantageously provides an apparatus, and an associated methodology, to provide for temporary activation of a wireless device.

Through operation of an embodiment of the present disclosure, a manner is provided by which to activate a wireless device, such as a wireless device borrowed from another, to provide for secure effectuation of a selected communication service for a selected period.

In one aspect of the present disclosure, a user is able to borrow a substitute, wireless device and use the substitute wireless device for a limited period to effectuate the communication service. Upon termination of the limited period, all data communicated to the borrowed, wireless device is deleted, and the borrowed, wireless device becomes no longer useable to perform the communication service based on the account of the user that borrowed the wireless device.

In another aspect of the present disclosure, a user, who does not have access to the wireless device regularly used by the user but still wants to access the user's personal information available at a secure server, is able to access the information by way of a substitute wireless device, such as a borrowed wireless device.

In another aspect of the present disclosure, a temporary activation scheme is provided. The temporary activation, which provides for activation of a wireless device, temporarily used by a user, such as a user who borrows a wireless device of another. In one implementation, the temporary activation is initiated at the wireless device. In another implementation, the temporary activation is network-initiated, activated and later de-activated at given times. In one implementation the temporary activation is initiated at the wireless device. In another implementation, the temporary activation is network-initiated, activated and later de-activated at given times.

In another aspect of the present disclosure, when a user elects to use a wireless device other than the wireless device that is associated with the user account of the user, the user initiates approval of use of the substitute wireless device. In the approval process, shared secret keys are exchanged by the borrowed, wireless device and a network server or other entity. The shared secret keys are used pursuant to subsequent data communication pursuant to a selected data communication service.

In another aspect of the present disclosure, the user of the substitute wireless device also makes selection of a selected communication service to be available to be performed at the substitute wireless device including, e.g., a communication service that provides personal/private data to the user. The communication services available to the user of the substitute wireless device are, for example, communicated to the substitute wireless device by the network entity. And, once received at the wireless device, the communication services to be made available to the user of the substitute wireless device are displayed, such as in a listing of communication services displayed at a user display of the wireless device. The user makes selection from amongst the displayed services. If the communication service that the user wants to utilize the substitute wireless device to effectuate is contained in the list, the selection is made of the identified communication service. And, once selected, an indication of the selected communication service is sent to the network entity. In one implementation, only the data required by the user pursuant to the selected communication service is synchronized. If, e.g., the user desires to receive address book information, user selection to receive this information causes only the address book information to be synchronized and provided.

In another aspect of the present disclosure, the substitute wireless device, once approved for operation and the selection is made of the selected communication service, the substitute wireless device is available for use pursuant to the selected communication service of the user's account. In one implementation, the time period during which the substitute wireless device is available for use pursuant to the selected communication service associated with the user's account is selected by the user and communicated to the network entity. In one implementation, the time period is defined by a termination indication provided by the user by way of a user interface of the substitute wireless device when the user no longer needs to use the substitute wireless device pursuant to the selected communication service.

In another aspect of the present disclosure, the network server or other network entity supports the operation of multiple devices that are activated onto a single-user account. By providing for management of multiple devices activated, or otherwise associated, with a single account, a communication service is permitted to be provided both to the substitute wireless device and to the wireless device otherwise used by the user. Thereby, when the user utilizes the substitute wireless device pursuant to the selected communication service, the communication data is also provided to the permanent wireless device in conventional manner.

In another aspect of the present disclosure, communication data communicated to the substitute wireless device is stored at a memory cache. The storage data is protected by an encryption key whose availability is limited. Once no longer availability the stored data also becomes unavailable. The memory cache is; in one implementation, also password protected with a password selected by, or known to, the user. Thereby, data provided to the substitute wireless device is available only to the user of the substitute wireless device and, if desired, not to others such as the regular user of the substitute wireless device.

In another aspect of the present disclosure, upon termination of the period during which the substitute wireless device is available for use pursuant to the selected communication service on behalf of the user's account, the substitute wireless device is logged out of the user's account and the user's data stored at the memory cache is deleted, and the shared encryption key is deleted. A message is sent to the network server, or other network entity, to provide network notification that the user has logged out. The key created and used at the network is deleted. And, additional data is not sent by the network to the wireless device for the temporary user.

Thereby, a manner is provided by which to permit a user to borrow the wireless device of another and to communicate pursuant to a selected communication service for a temporary period. When the user no longer requires the use of the substitute wireless device, the communication data associated with the selected communication service of the user's account is deleted from the substitute wireless device.

In these and other aspects, therefore, an apparatus and an associated method are provided for facilitating access to temporary-user data pursuant to a selected temporary-user communication service at a first wireless device. An approver is configured to effectuate approval of temporary use of the first wireless device to be used for access to the temporary-user data pursuant to the temporary-user communication service. A session terminator is configured to terminate the temporary-user communication service at the first wireless device upon termination of a selected period. Session termination, is also permitted to be implemented at a network entity.

In these and other aspects, a further apparatus and an associated method are provided for a network device of a radio network. A user account manager is configured to manage a multiple-device, single-user account that permits both a first-device, temporary-user communication service and a second-device, permanent-user communication service. A data communicator is configured to effectuate first-device data communication pursuant to the temporary-user communication service and to effectuate second-device data communication pursuant to the second-device permanent-user communication service.

Referring first, therefore, to FIG. 1, a communication system, shown generally at 10, provides for radio communications with wireless devices of which the mobile station 12-1 and 12-2 are representative. Communications are carried out to perform communication services in which communication data is communicated or exchanged by way of a radio air interface, here represented by the arrows 16. While the following description of operation of the communication system 10 describes operation with respect to the exemplary implementation in which the communication system comprises a cellular communication system in which communications with the mobile stations 12 are carried out in conformity with operating standards of a cellular communication system. More generally, the communication system 10 is representative of any of various types of radio communications systems and the mobile stations 12 are representative of any of various wireless devices.

The communication system includes a network part, here represented by a Radio Access Network (RAN) 22 and a Packet Data Network (PDN) 24. Computing and communication entities are connected in communication connectivity with the packet data network, here including a communication station 28, such as a computer work station and an application mobile station servicing system 32. In one implementation, the servicing system 32 comprises a computer server. The servicing system 32 here works in conjunction with an application server 34 that is placed in communication connectivity with the servicing system 32. The application server 34 is representative, for example, of an email server of an enterprise through which email messages, and the like, that are communicated to, or from, mobile stations 12 operated by enterprise personnel, i.e., users, are routed.

The application mobile station servicing system 32, amongst other things, provides account control of user accounts associated with the mobile station 12. For instance, and as noted previously, a mobile station 12 is typically allocated to a user, and communications intended for a user are sent to the mobile station associated with the user. That is to say, a mobile station is typically allocated, or otherwise assigned, to a single user. And the communication data intended for a user is communicated to and from the mobile station allocated to the designated user.

By way of an example, for instance, the mobile station 12-1 is permanently associated with a particular user. In normal operation, communication services are performed by communicating communication data between the mobile station 12-1 and a communication end point, such as the communication station 28. However, as noted previously, in the event that the user does not have access to the mobile station associated with that user, i.e., the user's regulator permanent mobile station, the user is unable to access communication services to communicate data or to obtain communication data associated with a communication service. The user may, for instance, forget to carry the mobile station, misplace the mobile station, or otherwise not be in proximity to the permanent mobile station of the user when the user desires to access a selected communication service or communication data.

Pursuant to operation of an embodiment of the present disclosure, an apparatus 38 is provided for a mobile station, here represented at the mobile station 12-2, which forms a substitute mobile station with respect to the user's permanent mobile station 12-1. The apparatus 38 provides for use of the substitute mobile station 12-2 by the user associated with the mobile station 12-1 to permit the user to take part in, or otherwise perform, a communication service or access communication data associated with the user's account. The user is able to use a mobile station associated with, and borrowed from, another to perform the communication service, such as access stored communication data. The elements of the apparatus 38 are functionally represented, implementable in any desired manner including, for instance, by algorithms executable by processing circuitry, hardware elements, and combinations thereof.

The apparatus 38 is here shown to include an approver 42, a session terminator 46, a user interface 48, a controller 50, a memory element forming a cache 52, and a password protector 54.

When the user elects to use the mobile station 12-2 as a substitute mobile station, in substitution for the permanent mobile station 12-1 normally associated with the user, the user initiates operation of the mobile station 12-1 for its temporary function to perform communication services for the account of a temporary user, i.e., the user that is associated with the mobile station 12-1.

The temporary user borrows or is otherwise provided access to the mobile 12-2 and initiates its operation as a substitute mobile station. The user initiates the temporary operation of the mobile station 12-2 by way of entry at an input element 58 of the user interface 48 to indicate the election to initiate operation of the mobile station 12-2 in this manner. An indication of the initiation is provided to the approver 42, and signaling is caused to be sent by a transmit (TX) part 62 of the mobile station. Signaling responses, generated at the network part of the communication system, such as at the mobile station servicing system 32, are received at a receive (RX) part 64 of the mobile station. Pursuant to the signaling between the substitute mobile station and the mobile station servicing system 32, keys are generated and exchanged, upon network permission. Permission is granted or denied based on any of various criteria, including, e.g., the type of device from which the temporary operation is initiated. In an alternate implementation, the permission refusal is provided to the wireless device as part of an IT policy that indicates types of wireless devices that are trusted or not trusted. Key generation and exchange by the mobile station 12-2 is represented by the key generator/exchanger 68 of the approver 42. In the exemplary implementation, the key generation and exchange is performed pursuant to a shared-secret encryption scheme in which communication data subsequently communicated between the servicing system 32 and the mobile station 12-2 is sent in encrypted form and de-encrypted, once received.

The temporary user of the substitute mobile station 12-2 also selects, indicated by way of a selector 70 of the approver 42, a communication service to perform using the temporary mobile station 12-2. In the exemplary implementation, signaling is exchanged between the mobile station and the servicing system 32. And, a listing of communication services that are to be available to the temporary user to be performed at the substitute mobile station is sent to the mobile station. In one implementation, the listing, once received, is caused to be displayed at a display element 72 of the user interface 48. The user makes selection from amongst the entries on the displayed list of available communication services. The available communication services might not include all of the services that are available to the user when using a permanent mobile station and may also not be identical to the communication services to a regular user of the mobile station. In the exemplary implementation, the user also inputs, by way of the input element 58, a time, or other duration during which the substitute mobile station is to be available to be operable pursuant to the selected communication service available for the temporary user.

Once the signaling exchange has been completed and the approver obtains approval to operate of the substitute mobile station to perform the selected communication service for the temporary user, the selected communication service is performed. Here, the controller 50 of the mobile station controls mobile-station operation to perform operations associated with the selected communication service. During this use by the temporary user, the data of the regular user of the wireless device is unaccessible, i.e., hidden from or prevented from access by the temporary user.

When the time period during which the mobile station is to be operable on behalf of the temporary user to perform the selected communication service expires, the session terminator 46 causes termination of the communication service for the benefit of the temporary user at the substitute mobile station.

In the exemplary implementation, the temporary user also inputs, by way of the input element, a password that is provided to the password protector to password-protect communication data stored at the cache 52. The password protection provided at the cache 52 limits access to the communication data, generated or received during performance of the selected communication service, to the substitute user. The data stored at the cache 52 in the exemplary implementation, is stored in a contiguous block of memory, protected by the operating system pursuant to a conventional technique, thereby to add an additional level of security to limit access to the data by other than the temporary user. Others, such as the regular user of the mobile station 12-2, are unable to access its contents pursuant to data encryption and, also, password protection.

Upon session termination initiated by the session terminator, the data stored at the cache 52 is deleted and the generated keys used during the performance of the selected communication service are deleted. And, the communication-service session ends. The mobile station is thereafter operated in its normal mode, i.e., as a mobile station for use by its regular user rather than the temporary user.

The application mobile station servicing system 32 also includes further apparatus, apparatus 82 of an embodiment of the present disclosure. The apparatus 82 is also functionally represented, implementable in any desired manner including algorithms executable by processing circuitry, hardware implementations, and combinations thereof. The apparatus 82 is here shown to include a user account manager 84 and a data communicator 88.

The user account manager 84 operates, amongst other things, to manage user accounts. In the exemplary implementation, the user account manager, in addition to conventional management operation, further provides for management of multiple-device, single-user accounts to permit a user associated with a primary mobile station to utilize a substitute mobile station, such as operation described above with respect to the mobile station 12-2 forming a substitute mobile station to permit a temporary user of the mobile station to utilize the mobile station pursuant to a selected communication service for a selected period. And, in operation, the user account manager thereby provides for account management of both the mobile station 12-1 and the mobile station 12-2 pursuant to a single account. When the selected communication service commences, the user account manager causes the data communicator 88 to effectuate the selected communication service with the substitute mobile station 12-2. In the exemplary implementation, the selected communication service is also carried out, concurrently, with the primary mobile station 12-1, unless the mobile station is indicated to have been stolen, lost, or at risk of a security breach. And, when the session is to be terminated, the user account manager manages the session termination.

Figure 2:
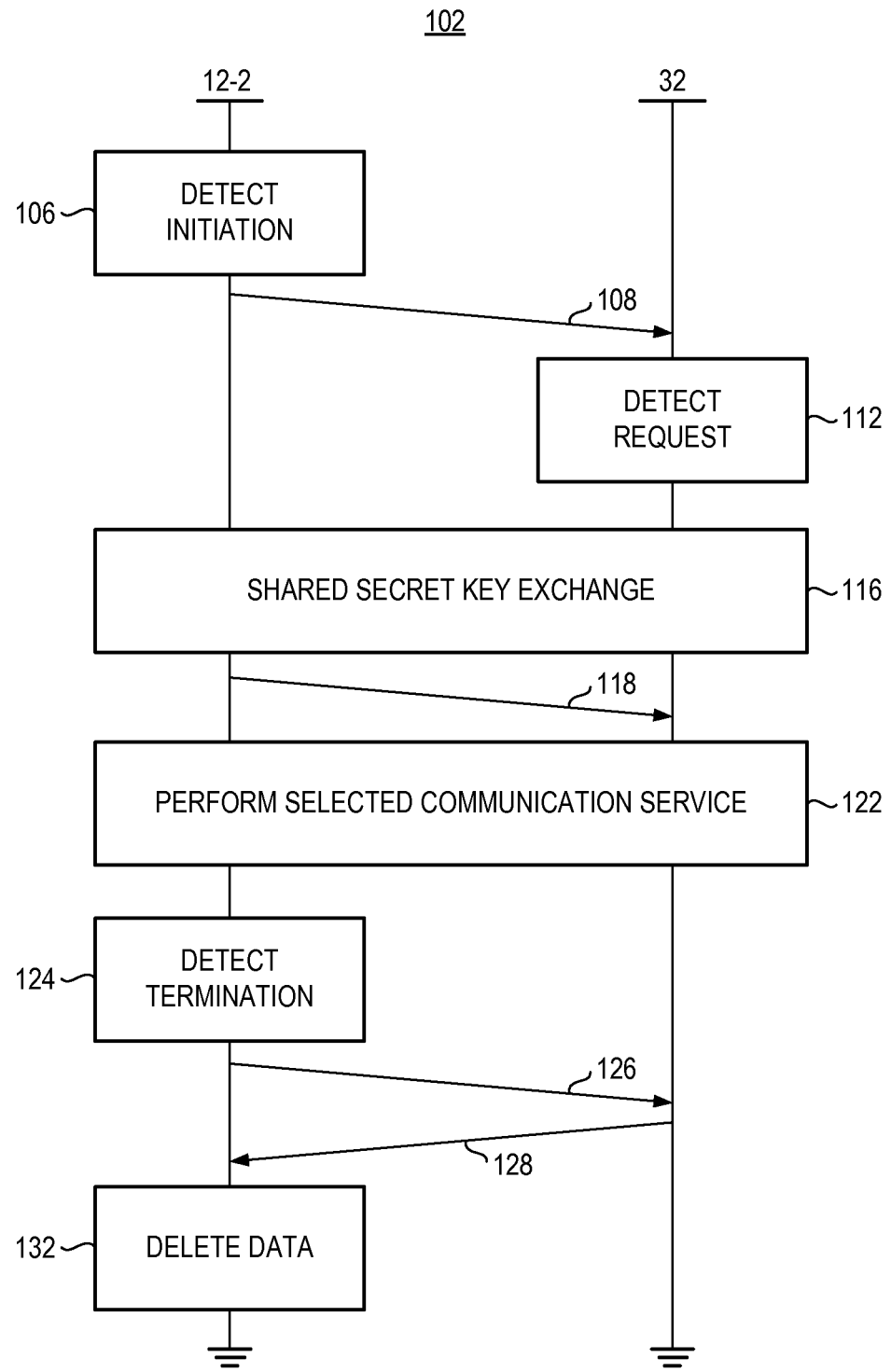
FIG. 2 illustrates a message sequence diagram representative of the signaling generated during operation of an embodiment of the present disclosure.

FIG. 2 illustrates a process diagram, shown generally at 102, representative of signaling generated pursuant to operation of an embodiment of the present disclosure. Signaling is represented in terms of the substitute mobile station 12-2 and the application mobile station servicing system 32 shown in FIG. 1.

Operation commences when the temporary user of the mobile station 12-2 initiates operation by entry of an input request, and the initiation is detected, indicated by the block 106. Signaling between the mobile station 12-2 and the servicing system 32 commences. A request is generated and sent, indicated by the segment 108, over a radio air interface, radio access network, and packet data network for delivery to the servicing system 32. Delivery of the request is detected, indicated by the block 112. The request is accepted, and shared secret keys are generated at the respective devices and shared, indicated by the block 116. Additional information is provided, indicated by the segment 118, by the substitute mobile station to the servicing system 32 including, for instance, the duration period during which the substitute mobile station is to be operable pursuant to the selected communication service for the temporary user.

Thereafter, and as indicated by the block 122, the communication service is performed. Then, and as indicated by the block 124, when the service period is to be terminated, such as timing out of a selected time period or user selection to terminate the communication-service session, the termination time is detected. The communication-service session is caused to be terminated, and signaling is performed between the mobile station and the servicing system, indicated by the segments 126 and 128 to terminate the communication-service session. And, as indicated by the block 132, the communication data is deleted.

Figure 3:
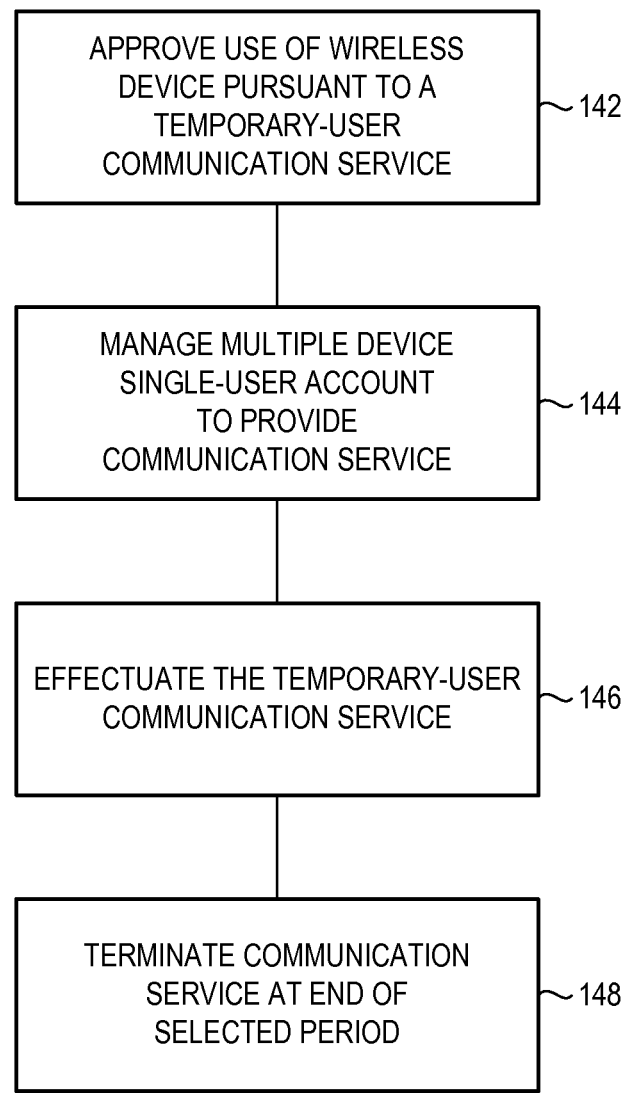
FIG. 3 illustrates a method flow diagram representative of the method of operation of an embodiment of the present disclosure.

FIG. 3 illustrates a method flow diagram, shown generally at 138, representative of the method of operation of an embodiment of the present disclosure. The method facilitates performance of communication services. First, and as indicated by the block 142, temporary use of a first wireless device for communication of temporary-user data pursuant to a temporary-user communication service is approved. Then, and as indicated by the block 144, a multiple-device, single-user account is managed to provide the temporary-user communication service both to a primary mobile station and to a substitute mobile station to effectuate the temporary-user communication service. And, as indicated by the block 146, the communication service is effectuated. Subsequently, and as indicated by the block 148, the communication service at the first wireless device is terminated upon termination of a selected period. Notification is made to the network, keys generated by the network are deleted, and data communications to the wireless device on behalf of the temporary user are terminated.

Thereby, a user of a mobile station is able to use the mobile station of another to perform a communication service normally carried out by the user at the mobile station that the user regularly utilizes. In the event that the user forgets to carry, or misplaces, the mobile station that the user regularly uses, a substitute mobile station can be borrowed and used to perform the selected communication service. The communication service is carried out securely in which the data is communicated in encrypted form, and communication data cached at the mobile station is password-protected, available only to the temporary user of the mobile station.

Presently preferred embodiments of the disclosure and many of its improvements and advantages have been described with a degree of particularity. The description is of preferred examples of implementing the disclosure and the description of preferred examples is not necessarily intended to limit the scope of the disclosure. The scope of the disclosure is defined by the following claims.

What is claimed is:

1. An apparatus for facilitating operation of a first wireless device permanently associated with a permanent first account and a permanent communication service, and for facilitating access to temporary-user data associated with a second account pursuant to a selected temporary-user communication service associated with the second account at the first wireless device, the first wireless device temporarily associated with the second account, said apparatus comprising:
an approver configured to effectuate approval of temporary use of the first wireless device to be used for a selected time period to access the temporary-user data associated with the second account pursuant to the temporary-user communication service associated with the second account, wherein during the selected time period data associated with the permanent first account is inaccessible via the first wireless device; and
a session terminator configured to terminate access to the temporary-user data pursuant to the temporary-user communication service associated with the second account at the first wireless device upon termination of the selected time period, and further configured to delete the temporary-user data communicated to the first wireless device upon termination of the selected time period, and wherein the data associated with the permanent first account is accessible via the first wireless device upon termination of the selected time period.

2. The apparatus of claim 1 wherein said approver comprises key generator configured to generate a shared key usable to encrypt or de-encrypt the temporary-user data.

3. The apparatus of claim 2 wherein the shared key is configured to encrypt usage of an enabled communication medium.

4. The apparatus of claim 1 wherein said approver further comprises a selector configured to provide for selection of the selected temporary-user communication service.

5. The apparatus of claim 4 further comprising a user interface configured to receive an input selection, a received input selection provided to said selector.

6. The apparatus of claim 5 wherein said user interface is further configured to display a list of available communication services and wherein the received input selection comprises a communication service contained in the list of available communication services displayed at said user interface.

7. The apparatus of claim 1 further comprising a communication-service controller configured to control performance of the temporary-user communication service.

8. The apparatus of claim 1 further comprising a cache configured to store the temporary-user data communicated pursuant to the temporary-user communication service.

9. The apparatus of claim 8 further comprising a password protector configured to password protect the temporary-user data at said cache.

10. The apparatus of claim 1 wherein said session terminator is configured to terminate the temporary-user communication service upon termination of a temporary-user-selected time period.

11. The apparatus of claim 10 wherein the temporary-user-selected time period comprises a network-configured time period.

12. The apparatus of claim 10 wherein the temporary-user-selected time period comprises a wireless-device configured time period.

13. The apparatus of claim 1 wherein said session terminator is configured to terminate the temporary-user communication service at the first wireless device responsive to a termination selection, the termination selection determinative of the termination of the selected period.

14. The apparatus of claim 1 wherein the first wireless device is further operable to communicate permanent-user data pursuant to a selected permanent-user communication service.

15. An apparatus for a network device of a radio network to facilitate operation of a first wireless device, associated with a permanent first account and a permanent communication service, pursuant to a selected temporary-user communication service associated with a second account, said apparatus comprising:
a user account manager configured to manage the temporary-user communication service associated with the second account at the first wireless device that is associated with the permanent first account and the permanent communication service, wherein the temporary-user communication service is to be used for a selected time period and, during the selected time period, data associated with the permanent first account is inaccessible via the first wireless device;
a data communicator configured to effectuate data communication pursuant to the temporary-user communication service associated with the second account during the selected period; and
a session terminator configured to delete temporary user-data communicated to the first wireless device pursuant to the temporary-user communication service upon termination of the selected time period and, wherein the data associated with the permanent first account is accessible via the first wireless device upon termination of the selected time period.

16. The apparatus of claim 15 wherein said user account manager further comprises a key generator configured to generate a first key usable to encrypt or de-encrypt temporary-user data communication pursuant to the temporary-user communication service.

17. The apparatus of claim 15 wherein said user account manager is configured to permit the temporary-user communication service responsive to a first-device-generated request.

18. The apparatus of claim 17 wherein said user account manager is further configured to terminate communication of the temporary-user data upon termination of the selected period.

19. A method for facilitating operation of a first wireless device permanently associated with a permanent first account and a permanent communication service, and for facilitating access to temporary-user data associated with a second account pursuant to a selected temporary-user communication service associated with the second account at the first wireless device, the first wireless device temporarily associated with the second account, said method comprising:
approving temporary use of the first wireless device for a selected time period to communicate the temporary-user data associated with the second account pursuant to the temporary-user communication service associated with the second account, wherein during the selected time period data associated with the permanent first account is inaccessible via the first wireless device; and
terminating the temporary-user communication service associated with the second account at the first wireless device upon termination of the selected time period; and deleting the temporary-user data communicated to the first wireless device upon termination of the selected time period, and wherein the data associated with the permanent first account is accessible via the first wireless device upon termination of the selected time period.

20. A method for facilitating operation of a first wireless device, associated with a permanent first account and a permanent communication service, pursuant to a selected temporary-user communication service associated with a second account, said method comprising:
   managing the temporary-user communication service associated with the second account at the first wireless device that is permanently associated with the second account and the permanent communication service, wherein the temporary-user communication service is to be used for a selected time period and, during the selected time period, data associated with the permanent first account is inaccessible via the first wireless device;
   effectuating data communication pursuant to the temporary-user communication service associated with the second account during the selected time period; and
   deleting temporary-user data communicated to the first wireless device pursuant to the temporary-user communication service upon termination of the selected time period and, wherein the data associated with the permanent first account is accessible via the first wireless device upon termination of the selected time period.

21. A non-transitory computer readable medium comprising executable instructions for facilitating operation of a first wireless device associated with a permanent first account and a permanent communication service, and for facilitating access to temporary-user data associated with a second account pursuant to a selected temporary-user communication service associated with the second account at the first wireless device, the executable instructions executable by the first wireless device, and the executable instructions comprising:
   approving temporary use of the first wireless device for a selected time period to communicate the temporary-user data associated with the second account pursuant to the temporary-user communication service associated with the second account, wherein during the selected time period data associated with the first account is inaccessible via the first wireless device; and
   terminating the temporary-user communication service associated with the second account at the first wireless device upon termination of the selected time period; and
   deleting the temporary-user data communicated to the first wireless device upon termination of the selected time period and, wherein the data associated with the permanent first account is accessible via the first wireless device upon termination of the selected time period.

22. A non-transitory computer readable medium comprising executable instructions for facilitating operation of a first wireless device, associated with a permanent first account and a permanent communication service, pursuant to a selected temporary-user communication service associated with a second account, the executable instructions executable by the first wireless device, and the executable instructions comprising:
   managing the temporary-user communication service associated with the second account at the first wireless device that is permanently associated with the second account and the permanent communication service, wherein the temporary-user communication service is to be used for a selected time period and, during the selected time period, data associated with the permanent first account is inaccessible via the first wireless device;
   effectuating data communication pursuant to the temporary-user communication service associated with the second account during the selected time period; and
   deleting temporary-user data communicated to the first wireless device pursuant to the temporary-user communication service upon termination of the selected time period and, wherein the data associated with the permanent first account is accessible via the first wireless device upon termination of the selected time period.

\* \* \* \* \*